Figure 1:
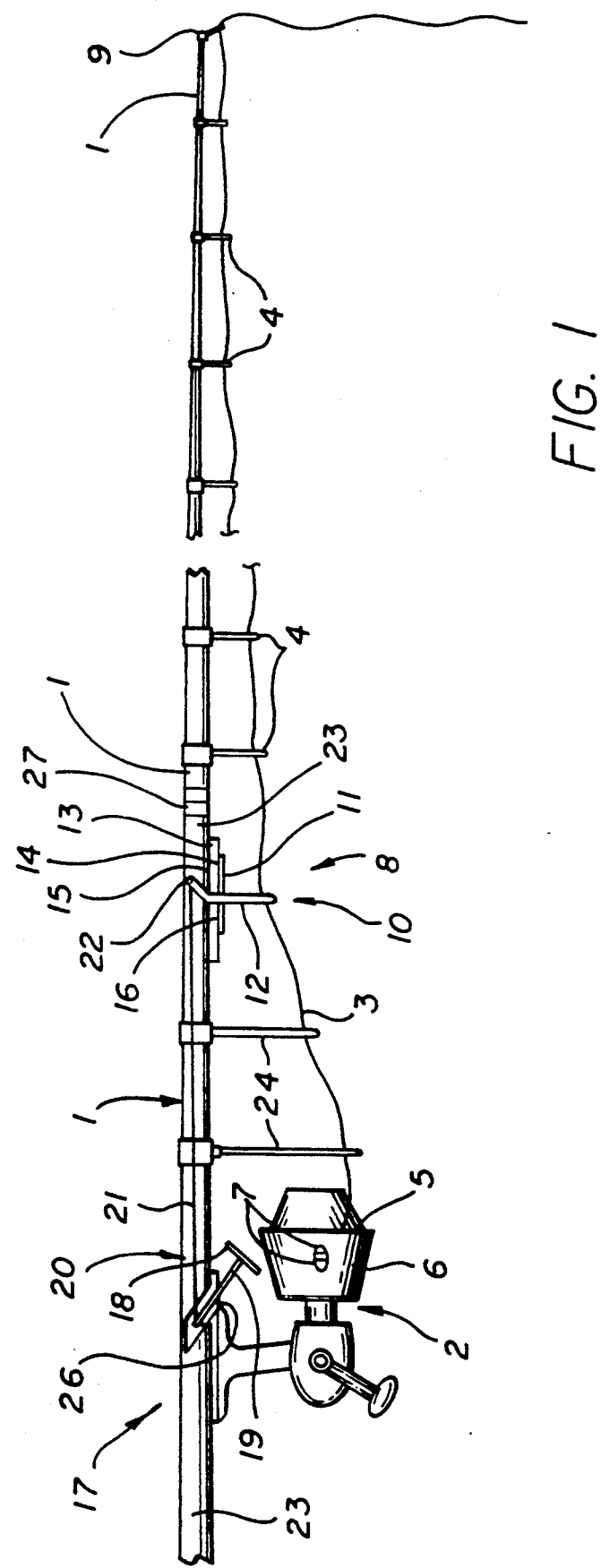

United States Patent [19]

Kvarnström

[11] Patent Number: 5,207,015
[45] Date of Patent: May 4, 1993

[54] ACTIVE FLY-FISHING EQUIPMENT

[76] Inventor: Leif R. E. Kvarnström, Timmermansvägen 23, S-441 50 Alingsås, Sweden

[21] Appl. No.: 781,193

[22] PCT Filed: Jun. 6, 1990

[86] PCT No.: PCT/SE90/00390
§ 371 Date: Dec. 6, 1991
§ 102(e) Date: Dec. 6, 1991

[87] PCT Pub. No.: WO90/14762
PCT Pub. Date: Dec. 13, 1990

[30] Foreign Application Priority Data

Jun. 8, 1989 [SE] Sweden .................. 8902067

[51] Int. Cl.⁵ .............................................. A01K 87/00
[52] U.S. Cl. .......................................... 43/25; 43/18.1
[58] Field of Search ................... 43/18.1, 25, 19, 19.2, 43/20, 24

[56] References Cited

U.S. PATENT DOCUMENTS

| | | | |
|---|---|---|---|
| 2,791,858 | 5/1957 | Kernodle | 43/25 |
| 2,843,963 | 7/1958 | Butehorn | 43/25 |
| 3,034,246 | 5/1962 | Davidson | 43/18.1 |
| 3,045,380 | 7/1962 | Meredith | 43/25 |
| 3,952,443 | 4/1976 | Kaminski | 43/25 |
| 4,051,617 | 10/1977 | Dorph | 43/18.1 |
| 4,539,773 | 9/1985 | Eldridge | 43/25 |

FOREIGN PATENT DOCUMENTS 1274848 8/1968 Fed. Rep. of Germany.

Primary Examiner—Richard K. Seidel
Assistant Examiner—Chuck Y. Mah
Attorney, Agent, or Firm—Poms, Smith, Lande & Rose

[57] ABSTRACT

An fly fishing arrangement includes a rod and a reel, with a plurality of substantially aligned outer rod rings between the reel and the tip of the rod. A manually controllable line-blocking mechanism is mounted on the rod and includes a clamping member and a clamping surface, mounted on the rod outward from the reel. When the line-blocking mechanism is in a running position, the clamping member is substantially perpendicular to the rod to permit the line to run off of the rod freely and substantially without deflection; when it is in a blocking position, the line is clamped between the clamping member and the clamping surface. A control mechanism for switching the line-blocking mechanism between the running and blocking positions is located on the rod adjacent to the reel to allow actuation of the control means and thereby the line-blocking mechanism using a finger of the hand of the user's casting arm. A spring biases the control mechanism into the running position. A connecting device is provided for transmitting force from the control mechanism to the line-blocking mechanism. A plurality of intermediate rod rings are located on the rod between the reel and the clamping member. In one embodiment, the control mechanism is a pivoted tab; in another embodiment, it is a slide bar that is in the blocking position when the user pushes the slide bar into a casing mounted on the rod.

14 Claims, 3 Drawing Sheets

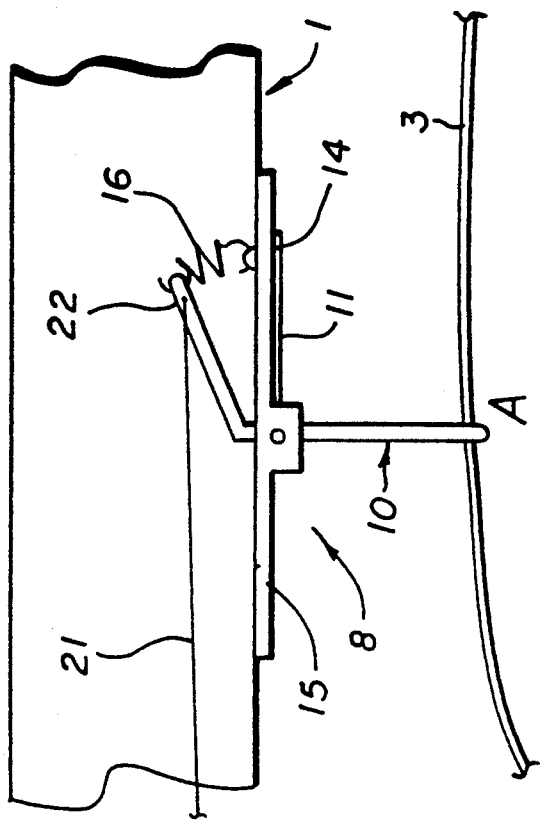
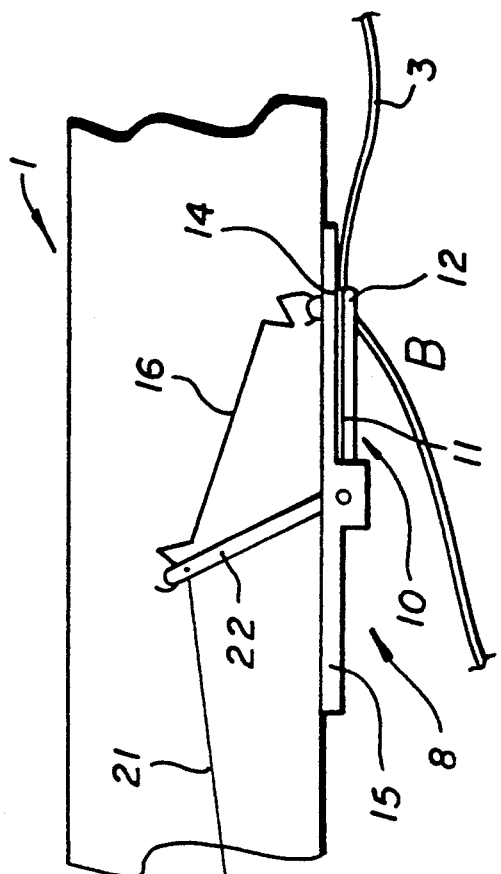
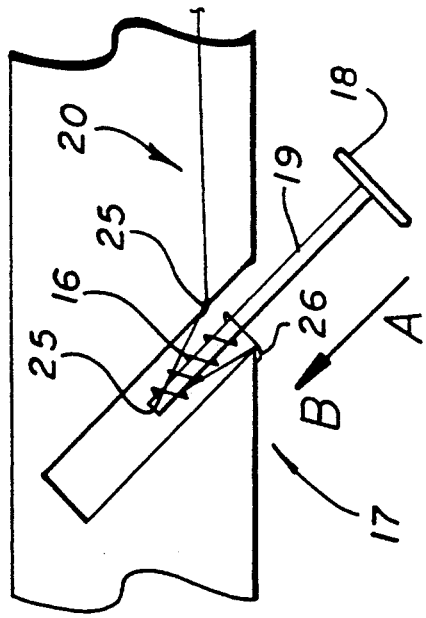
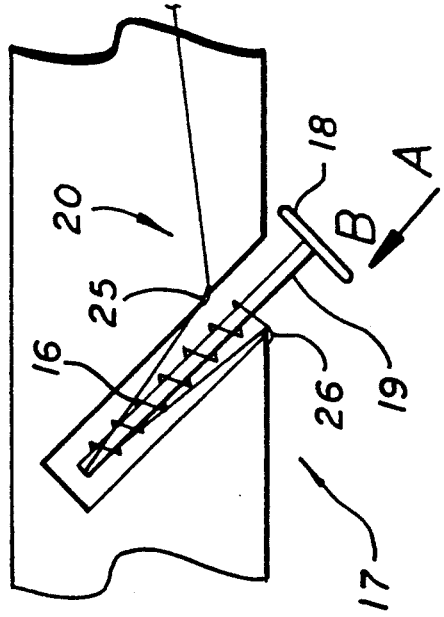
FIG. 4a
FIG. 4b

ACTIVE FLY-FISHING EQUIPMENT

The invention ACTIVE FLY-FISHING EQUIPMENT comprises an actively operating FLY YOKE REEL, dynamically matched ROD RINGS and a FLY-LINE BLOCKING SYSTEM. The invention is described as fitted to a rod extension part (subsequently ext.).

Conventional fly fishing presupposes a very high degree of concentration in order to achieve the motoric coordinating cooperation between the casting-out motion of the casting arm and the line work of the other hand while at the same time observing the line flying through the air and the line in the grass, in water etc., which has not been cast.

The object of the invention is to specify a new type of equipment precisely for fly fishing, in which the hard motoric coordinating cooperation has been eliminated by rationalisation.

This object is achieved by the reel secured to the ext., a half-open, newly designed FLY YOKE REEL, actively cooperating with dynamically matched ROD RINGS and a LINE BLOCKING SYSTEM. The FLY YOKE REEL has as replaceable spool with a very large diameter for taking up a great length—100 m fly line plus backing line—of the relatively thick fly line without any risk of breaking and twisting and has on its casing surrounding the spool a foldable yoke for laying up the fly line on the spool by winding, and by the fact that a manually operable LINE BLOCKING SYSTEM for the fly line is fitted on the ext. at a distance forward/rearward of the FLY YOKE REEL so as to block and release the line at the moment of casting subject to the right interval of time. The LINE BLOCKING SYSTEM comprises a blocking device fitted on the extension, through which passes the fly line and which can be shifted between a position in which it allows the fly line to run freely and a position in which it blocks the line between itself and a blocking surface, whereby a control device capable of being actuated by finger is provided for shifting the blocking device between the running position and the blocking position and vice versa, said control device being connected to the blocking device by means of a transmission device on the rod, which is at a distance to the rear of the blocking device. Between the FLY YOKE REEL and the blocking arrangement there are one of several, preferably removable, rod rings with dynamically matched diameters, which are much larger than the rings between the blocking device and the tip of the rod.

When fly fishing with the equipment described above, the FLY YOKE REEL constitutes an ACTIVE device. The fly line is wound up after every cast as distinct from conventional fly fishing, where the reel is a passive device, the fly line being wound on to the reel during transportation.

Since the fly line is wound on to FLY YOKE REEL after every cast and unwound from the latter during casting, there is therefore no uncast fly line on the ground or in the water, on which to keep an eye. As regards right-handed persons, the line work by the left hand has been eliminated by rationalisation, and vice versa in the case of left-handed persons, inasmuch as this work is taken care of by manual operation of the blocking arrangement with the hand on the casting arm. Hence difficult coordination between the casting motion of one arm and the line work of the other hand is not required.

The equipment according to the invention simplifies fly fishing therefore by eliminating by rationalisation the moment of interference, while necessitating a lower degree of concentration than is the case with conventional fly fishing. When fishing with the ACTIVE FLY-FISHING EQUIPMENT, the fly line is wound on to the FLY YOKE REEL after every cast so that there is no uncast line on the ground or in the water and it is therefore not possible for uncast fly line to be acted upon by such factors as flowing water, wind, reeds, grass, seaweed, stones, shrubs, the fly fisherman's legs and feet etc.

Futhermore, the equipment enables a longer cast at less energy, since lifting energy is saved. As stated above, the fly line is wound on after every cast and unfurls from the fly yoke reel at the moment of casting. This entails a saving of lifting energy since the fly line is always at a high level, does not need to be lifted from the ground or out of the water, and there is no moment of interference as with conventional fly fishing. The lifting energy saved is stored in the dynamic motion of the fly line and gives rise to longer throws.

The advantages of the invention also include the fact that fly fishing is less sensitive to wind. Experienced fly fishermen can use the equipment at wind velocities of 6-10 m/sec. Besides, the ACTIVE FLY-FISHING EQUIPMENT is used without regard to the direction of the wind, since casting backward is as easy as casting forward.

Lastly the ACTIVE FLY-FISHING EQUIPMENT makes fly fishing safer, with less danger of personal injury due to the fly hook, since the moment of interference and the hard coordinating cooperation are eliminated by rationalisation.

Figure 2:
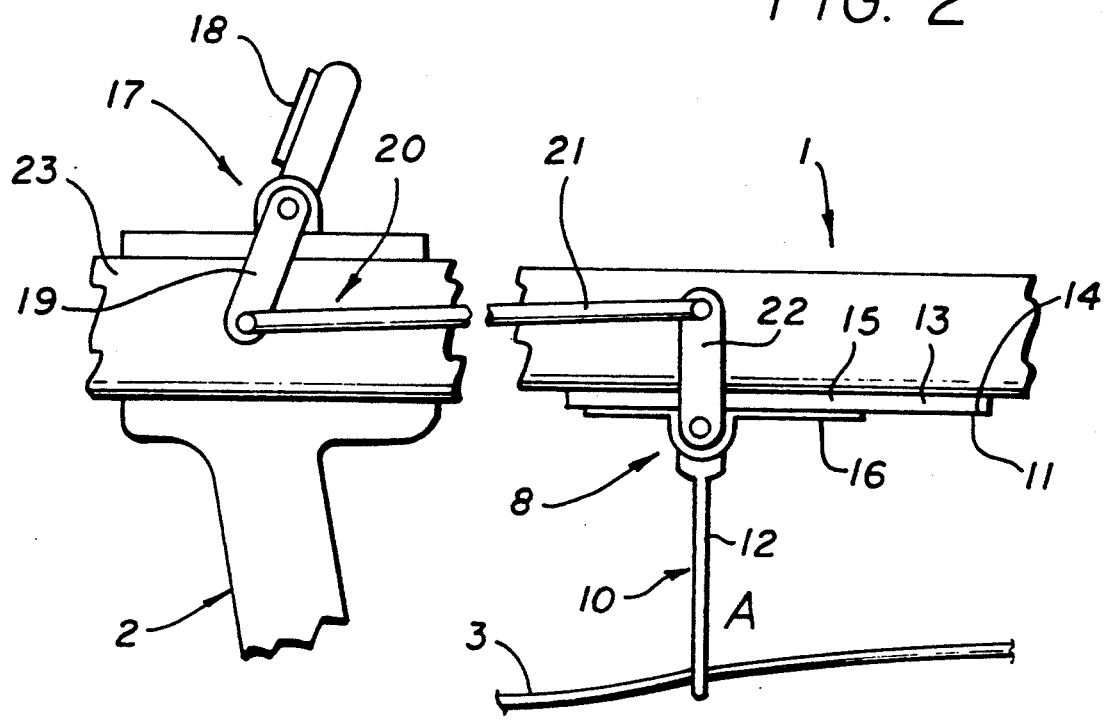
Figure 3:
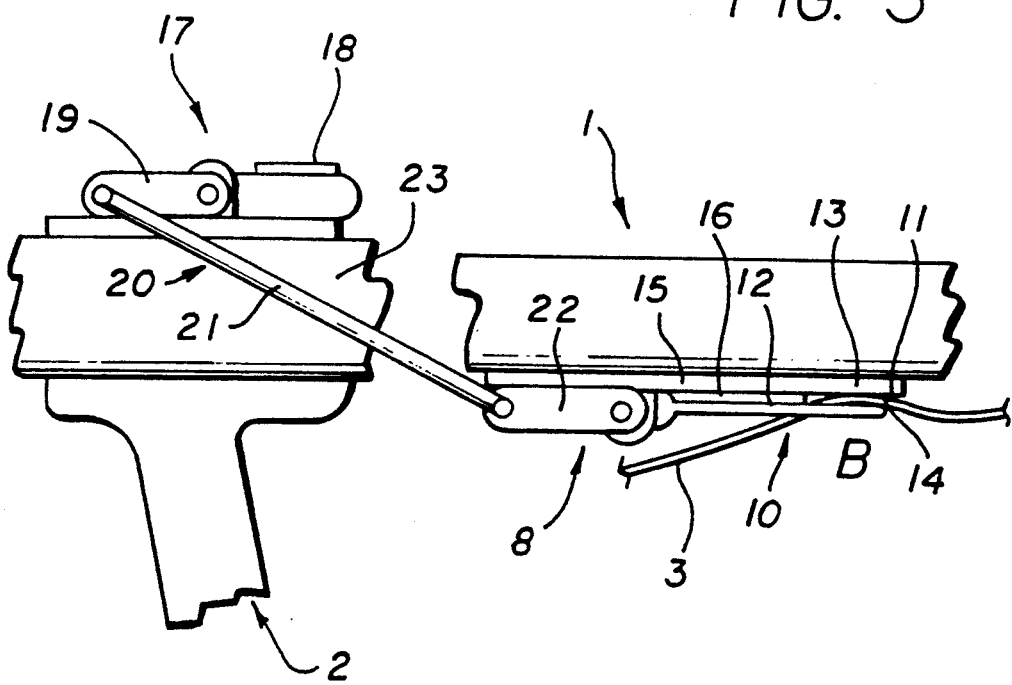

The invention is described below with reference to the attached drawings ¼, on which FIG. 1 shows a fly-fishing tackle equipped with the invention ACTIVE FLY-FISHING EQUIPMENT from the side. FIG. 1 shows a rod extension part 23 and a rod 1 in somewhat reduced form, FIG. 2 shows a part of the equipment according to FIG. 1 and illustrates the line blocking system thereof in an open position, while FIG. 3 corresponds to FIG. 2 but shows the blocking system in the blocking position.

FIG. 4 shows a line blocking system in both the blocking and running positions.

The fly-fishing equipment shown in the drawings comprises, by way of main components, the line blocking system, FIG. 4, a reel 2 for a fly line 3 removably fixed thereon, and dynamically designed rod rings 24 fitted one ext. 23, as well as ordinary conventional rod rings 4 on a rod 1.

Reel 2 is of an entirely new type described as a half-open fly yoke reel and operates actively at the moment of casting, inasmuch as the dynamics of motion of the fly line draw so much of the fly line from the reel as corresponds to the energy of motion of the line, while after casting laying up the line of the fly yoke reel by winding it up. Fly yoke reel 2 has a spool 5 of very large diameter so that it is able to take up the entire length of the relatively thick fly line as well as the backing line. The very large diameter obviates frictional losses and line twisting, whereas spool 5 can be replaced by other spools with fly lines 3 of different type, float- or sinklines, the lengths/dimensions of which are different.

On its casing 6 surrounding spool 5 fly yoke reel 2 has an either manually or automatically foldable yoke 7 made from steel or a similar material so as to ensure that during winding fly line 3 is correctly laid up on the spool.

A manually operable blocking arrangement for fly line 3, generally referred to by 8, FIG. 4, is fitted on ext. 23 in front of fly yoke reel 2, i.e. in the direction toward tip 9 of rod 1, with a view to blocking and releasing line 3 by means of the line blocking system shown in FIG. 4, at the right intervals of time at the moment of casting.

With the embodiments shown the manually operable blocking arrangement 8 comprises a blocking device 10 fitted on ext. 23, fly line 3 passing through said blocking device. The device can be shifted between a position A, in which it allows fly line 3 to run freely, and a position B, in which it blocks fly line 3 between itself and a blocking surface 11.

In greater detail, blocking device 10 of the embodiment shown comprises a rod ring 12 in swivelling manner secured to fixing plate 15 for swivelling between running position A and blocking position B. In running position A blocking rod ring 12 is folded outward to a position substantially perpendicular to ext. 23 and in line with the other rod rings 24, 4. In blocking position B blocking rod ring 12 is folded inward and rests against blocking plate 13 forming a blocking surface 11, which is advantageously provided with a braking friction lining 14 or similar device. Line blocking arrangement 8 is, together with securing and blocking plates 15 and 13, advantageously mounted on rod extension part 23. Blocking device 10 which is capable of swivel motion is advantageously prestressed, for instance with the aid of a spring 16, in the direction towards running position A.

Shifting or swivelling of blocking rod ring 12 between running position A and blocking position B and vice versa is brought about with the aid of a control device 17 capable of being actuated by finger, which with the embodiment shown consists in a pusher 18 fitted on ext. 23 near fly yoke reel 2 on the same side, FIG. 4, or on the opposite side, FIG. 2, in swivelling manner. Pusher 18, FIG. 2, is connected with a first lever 19 which at its end opposite pusher 18 is linked in articulated manner with one end of a transmission device 20, designed in the manner of a connecting rod 21. Pusher 18, FIG. 4, is secured to slide bar 19, which in position A is prestressed by spring 16 and comprises slide eye 25 through which device 20 passes and is anchored in slide bar casing 26. The device is here designed as a line, wire or similar part. Transmission device 20, FIG. 4 FIG. 2, is at its other end linked in articulated manner to the one end of another lever 22 connected with blocking rod ring 12. In this manner the movements of pusher 18 brought about by a finger are transmitted to blocking rod ring 12.

Control device 17 of pusher 18 can be located at another point, advantageously in the reel mounting or further back in the direction toward the rear end of the rod. Instead of connecting rod 21, which, with the aid of slots and openings, is fitted together with control device 17, FIG. 4, and blocking device 10 within rod extension part 23, it is possible to make use of a plastic or fibre line, a wire or a similar device, which in that case can be advantageously fitted as an external arrangement, if use is made of the ACTIVE FLY-FISHING EQUIPMENT or parts thereof by way of complementary equipment for fly or other fishing rods.

Between fly yoke reel 2 and blocking arrangement 8 there are special rod rings 24, FIG. 1, of which there can be several in number and which are by preference removably fitted on rod extension part 23. If the ACTIVE FLY-FISHING EQUIPMENT is used with conventional fly or other fishing rod ring(s) 24 is (are) by preference removably fitted between fly yoke reel 2, when this is secured in the reel mounting of the rod, and line blocking arrangement 8 fitted in the region of the rear rod ring 4, FIG. 1, as viewed from the tip of rod 1.

As specified above, the invention ACTIVE FLY-FISHING EQUIPMENT can be fitted on fly, spinning, casting or other fishing rods with or without rod extension part 23, which may be short for use with one hand or long for use with both hands.

I claim:

1. An arrangement for fly fishing, comprising:
   a rod that has an inner end, an outer end, and a plurality of substantially aligned outer rod rings;
   a reel that is mounted on the rod for unfurling fly line at a moment of casting and for winding up and furling the fly line after every cast, whereby the outer rod rings are located between the reel and the outer end of the rod;
   a manually controllable line-blocking mechanism including a clamping member and a clamping surface, mounted on the rod outward from the reel, having a running position, in which the clamping member is substantially perpendicular to the rod to permit the line to run off of the rod freely and substantially without deflection, and a blocking position, in which the line is clamped between the clamping member and the clamping surface;
   control means for switching the line-blocking mechanism between the running and blocking positions, located on the rod adjacent to the reel to allow actuation of the control means and thereby the line-blocking mechanism by using a finger of the head of the user's casting arm;
   connection means for connecting the control means and the line-blocking mechanism; and
   a plurality of intermediate rod rings located on the rod between the reel and the clamping member.

2. An arrangement as defined in claim 1, in which the clamping member is secured to the rod via a pivot and includes a clamping lever arm.

3. An arrangement as defined in claim 2, in which:
   the clamping member is a clamping ring attached to the clamping lever arm;
   the line passes through the clamping ring; and
   in the blocking position, the clamping ring is pivoted down to press the line against the clamping surface.

4. An arrangement as defined in claim 1, further including a spring for biassing the clamping member into the running position.

5. An arrangement as defined in claim 1, in which:
   the control means is a pivoted tab secured to a control lever arm; and
   the connection means comprises a rod connecting the control lever arm and a clamping lever arm.

6. An arrangement as defined in claim 1, in which the control means includes a pusher that is connected to a slide bar that slides in a casing and has an outer position and an inner position, and an inner end, said control means further including a pusher spring for biassing the pusher and slide bar into the outer position.

7. An arrangement as defined in claim 6, in which the connection means comprises a wire attached to the inner end of the slide bar and, via a slide eye, which is attached at an outer edge of the casing, to the clamping lever arm, whereby the clamping member is in the clamping position when the slide bar is in the inner position and is in the running position when the slide bar is in the outer position.

8. An arrangement as defined in claim 1, in which the clamping surface is provided with a braking friction lining.

9. An arrangement as defined in claim 1, in which the reel is a fly yoke reel including:
 a replaceable spool for taking up up to 100 meters of fly-fishing line, including backing line, without any risk of breaking and twisting;
 a casing;
 a foldable yoke on the casing and surrounding the spool for laying up the fly line on the spool when the line is being wound back onto the spool.

10. An arrangement as defined in claim 1, further including rod extension means, mountable on the rod, for mounting the reel, the manually controllable line-blocking mechanism, including the clamping member and the clamping surface, the control means, and the connection means.

11. A fly fishing arrangement, comprising:
 a rod that has an inner end, an outer end, and a plurality of substantially aligned outer rod rings;
 a reel that is mounted on the rod for unfurling fly line at a moment of casting and for winding up and furling the fly line after every cast, whereby the outer rod rings are located between the reel and the outer end of the rod;
 a manually controllable line-blocking mechanism including a clamping member comprising a clamping ring, and a clamping surface, mounted on the rod outward from the reel, having a running position, in which the clamping ring is substantially perpendicular to the rod and is substantially aligned with the outer rod rings, and the line is free to run off of the rod through the clamping ring, and a blocking position, in which the clamping ring is pivoted down to press the line against the clamping surface, whereby the line is clamped between the clamping member and the clamping surface;
 spring means for biasing the clamping member into the running position;
 control means for switching the line-blocking mechanism between the running and blocking positions, located on the rod adjacent to the reel to allow actuation of the control means and thereby the line-blocking mechanism by using a finger of the hand of the user's casting arm;
 connection means for connecting the control means and the line-blocking mechanism;
 said clamping member being secured to the rod via a pivot and including a clamping lever arm;
 said clamping member is a clamping ring attached to the clamping lever arm; and in which
 the control means is a pivoted tab secured to a control lever arm; and
 the connection means comprises a rod connecting the control lever arm and the clamping lever arm.

12. A fly fishing arrangement, comprising:
 a rod that has an inner end, an outer end, and a plurality of substantially aligned rod rings;
 a reel that is mounted on the rod for unfurling fly line at a moment of casting and for winding up and furling the fly line after every cast;
 a manually controllable line-blocking mechanism including a clamping member, comprising a clamping ring, and a clamping surface, mounted on the rod outward from the reel, having a running position, in which the clamping ring is substantially perpendicular to the rod and is substantially aligned with the rod rings, and the line is free to run off of the rod through the clamping ring, and a blocking position, in which the clamping ring is pivoted down to press the line against the clamping surface whereby the line is clamped between the clamping member and the clamping surface;
 spring means for biasing the clamping member into the running position;
 control means for switching the line-blocking mechanism between the running and blocking positions, located on the rod adjacent to the reel to allow actuation of the control means and thereby the line-blocking mechanism by using a finger of the hand of the user's casting arm;
 connection means for connecting the control means and the line-blocking mechanism;
 said clamping member being secured to the rod via a pivot and including a clamping lever arm;
 said clamping member is a clamping ring attached to the clamping lever arm; and in which
 the control means includes a pusher that is connected to a slide bar that slides in a casing and has an outer position and an inner position, and an inner end, said control means further including a pusher spring for biasing the pusher and slide bar in the outer position; and
 the connection means comprises a wire attached to the inner end of the slide bar and, via a slide eye, which is attached at an outer edge of the casing, to the clamping lever arm, whereby the clamping member is in the clamping position when the slide bar is in the inner position and is in the running position when the slide bar is in the outer position.

13. An arrangement for fly fishing, comprising:
 a rod that has an inner end and an outer end;
 a reel that is mounted on the rod for unfurling fly line at a moment of casting and for winding up and furling the fly line after every cast;
 a manually controllable line-blocking mechanism including a clamping member and a clamping surface, mounted on the rod outward from the reel, having a running position, in which the line is free to run off of the rod, and a blocking position, in which the line is clamped between the clamping member and the clamping surface;
 control means for switching the line-blocking mechanism between the running and blocking positions, located on the rod adjacent to the reel to allow actuation of the control means and thereby the line-blocking mechanism by using a finger of the hand of the user's casting arm; and
 connection means for connecting the control means and the line-blocking mechanism;
 in which the control means includes a slide bar that slides in a casing and has an outer position and an inner position, and an inner end, further including a spring for biasing the slide bar into the outer position.

14. An arrangement for fly fishing, comprising:
 a rod that has an inner end and an outer end;

a reel that is mounted on the rod for unfurling fly line at a moment of casting and for winding up and furling the fly line after every cast;

a manually controllable line-blocking mechanism including a clamping member and a clamping surface, mounted on the rod outward from the reel, having a running position, in which the line is free to run off of the rod, and a blocking position, in which the line is clamped between the clamping member and the clamping surface;

control means for switching the line-blocking mechanism between the running and blocking positions, located on the rod adjacent to the reel to allow actuation of the control means and thereby the line-blocking mechanism by using a finger of the hand of the user's casting arm; and connection means for connecting the control means and the line-blocking mechanism;

in which:

the control means includes a pusher that is connected to a slide bar that slides in a casing and has an outer position and an inner position, and an inner end, said control means further including a pusher spring for biassing the pusher and slide bar into the outer position;

the connection means comprises a wire attached to the inner end of the pusher and, via a slide eye, which is attached at an outer edge of the casing, to the clamping lever arm, whereby the clamping member is in the clamping position when the pusher and slide bar are in the inner position and is in the running position when the pusher and slide bar are in the outer position.

* * * * *